United States Patent
Duncan et al.

(10) Patent No.: US 10,152,200 B2
(45) Date of Patent: *Dec. 11, 2018

(54) NOTIFICATION AREA THAT PERSISTENTLY REARRANGES ELEMENTS

(71) Applicant: MICROSOFT TECHNOLOGY LICENSING, LLC, Redmond, WA (US)

(72) Inventors: Richard Duncan, Kirkland, WA (US); Latika Kirtane, Seattle, WA (US); Jeff Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/602,853

(22) Filed: Jan. 22, 2015

(65) Prior Publication Data

US 2015/0135107 A1 May 14, 2015

Related U.S. Application Data

(63) Continuation of application No. 12/163,843, filed on Jun. 27, 2008, now Pat. No. 8,972,893.

(51) Int. Cl.
*G06F 3/0482* (2013.01)
*G06F 9/54* (2006.01)
*G06F 3/048* (2013.01)

(52) U.S. Cl.
CPC ............ *G06F 3/0482* (2013.01); *G06F 3/048* (2013.01); *G06F 9/542* (2013.01)

(58) Field of Classification Search
CPC .......... G06F 3/0482; G06F 3/048; G06F 9/542
See application file for complete search history.

(56) References Cited

U.S. PATENT DOCUMENTS

| | | | |
|---|---|---|---|
| 5,617,526 A | * | 4/1997 | Oran .................... G06F 3/0481 715/779 |
| 7,181,697 B2 | | 2/2007 | Tai et al. |
| 7,343,567 B2 | | 3/2008 | Mann et al. |

(Continued)

OTHER PUBLICATIONS

Windows Vista™ Inside Out by: Ed Bott et. al. Microsoft Press, Jan. 17, 2007(Bott).*

(Continued)

*Primary Examiner* — William Bashore
*Assistant Examiner* — Nathan Shrewsbury
(74) *Attorney, Agent, or Firm* — Shook, Hardy & Bacon L.L.P.

(57) ABSTRACT

Embodiments described herein are directed to managing elements within a notification area of a graphical operating system. The elements may include any graphic, logo, or image associated with running software. A user indicates which elements can be displayed in the notification area, consequently creating a list of potentially displayable elements. For each listed element, an order of display, file location, and display status is designated. The user may freely change the order in which elements are displayed in the notification area by repositioning the displayed elements. Elements may be permanently removed from the notification area, resulting in their deletion from the list. Only elements entered into the order list, at the discretion of the user, are displayable within the notification area.

20 Claims, 5 Drawing Sheets

(56) References Cited

U.S. PATENT DOCUMENTS

| | | | |
|---|---|---|---|
| 7,631,270 B2 | 12/2009 | Cunningham et al. | |
| 8,285,855 B2 | 10/2012 | Lyndersay et al. | |
| 2006/0020904 A1* | 1/2006 | Aaltonen | G06F 3/048 |
| | | | 715/850 |
| 2006/0085758 A1 | 4/2006 | Backus | |
| 2006/0200773 A1 | 9/2006 | Nocera et al. | |
| 2006/0206457 A1 | 9/2006 | Crucs | |
| 2007/0094342 A1 | 4/2007 | Bostick et al. | |
| 2007/0094597 A1 | 4/2007 | Rostom | |
| 2007/0132860 A1 | 6/2007 | Prabhu et al. | |
| 2007/0186176 A1 | 8/2007 | Godley | |
| 2007/0214429 A1 | 9/2007 | Lyudovyk et al. | |
| 2009/0287604 A1 | 11/2009 | Korgav et al. | |
| 2009/0327940 A1* | 12/2009 | Duncan | G06F 3/048 |
| | | | 715/765 |
| 2011/0029604 A1 | 2/2011 | Bell et al. | |
| 2012/0011198 A1 | 1/2012 | Mazzaferri | |
| 2013/0268837 A1* | 10/2013 | Braithwaite | G06Q 10/10 |
| | | | 715/234 |

OTHER PUBLICATIONS

Customizing Windows Vista, Part 2 by Mark Hinton, PC Mag Apr. 2, 2007 (Hinton).*

Customizing Windows Vista, Part 2 by Mark Hinton, PC Mag Apr. 2, 2007, 1 page.

David Pogue, Mac OSX, The Missing Manual, Second Edition, Pogue Press, O'Reilly, pp. 91-93, 2002.

Final Office Action dated Jun. 18, 2013 in U.S. Appl. No. 12/163,843, 12 pages.

Final Office Action dated Jun. 20, 2012 in U.S. Appl. No. 12/163,843, 11 pages.

Non-Final Office Action dated Jan. 15, 2013 in U.S. Appl. No. 12/163,843, 11 pages.

Non-Final Office Action dated Mar. 27, 2014 in U.S. Appl. No. 12/163,843, 15 pages.

Non-Final Office Action dated Nov. 28, 2011 in U.S. Appl. No. 12/163,843, 12 pages.

Notice of Allowance dated Oct. 23, 2014 in U.S. Appl. No. 12/163,843, 8 pages.

Windows Vista™ Inside Out by: Ed Boll et. al. Microsoft Press, Jan. 17, 2007, 56 pages.

PS Tray Factory 2.5, 2 pages. Last accessed Mar. 12, 2008 http://www.freedownloadscenter.com/Utilities/Command_Shells/PS_Tray_Factory.html.

Taskbar Hide 1.20, 2 pages. Last accessed Mar. 12, 2008 http://www.freedownloadscenter.com/Shell_and_Desktop/Desktop_Toolbars_and_Launchers/Taskbar_Hide.html.

Trayicon Standard 1.4, 2 pages. Last Accessed Mar. 12, 2008 http://www.filedudes.com/TrayIcon_Standard-download-30682.html.

SysTrayX, 3 pages. Last accessed Mar. 12, 2008 http://www.programurl.com/systrayx.htm.

Final Office Action dated Jul. 17, 2014 in U.S. Appl. No. 12/163,843, 17 pages.

* cited by examiner

NOTIFICATION AREA THAT PERSISTENTLY REARRANGES ELEMENTS

PRIORITY

This application claims priority and is a continuation of application Ser. No. 12/163,843, filed 27 Jun. 2008, which is incorporated herein by reference in the entirety.

BACKGROUND

Since the advent of graphical user interfaces (GUIs), computers have been configured to graphically represent information and present the graphical information to a user for interaction. No longer do users have to memorize commands for entry at command prompts in order to interact with modern day computer applications. Instead, today's computers usually use graphics to present interactive software to users, so all a user has to do is manipulate an input device (e.g., a mouse) to user various computer applications.

Modern day operating systems (OSs) use a GUI as the primary means of interacting with the user. Examples of such OSs include, for example but without limitation, the various versions of Microsoft Windows® (developed by the Microsoft Corporation® headquartered in Redmond, Wash.), LINUX, and Mac OS (developed by Apple, Inc.® headquartered in Cupertino, Calif.). Some of these OSs display a toolbar area to a user that provides various functionality, such as a START menu (e.g., in Microsoft Windows®) for listing available applications, shortcuts to applications, time, date, etc.

In some OSs, the toolbar also presents a number of elements—which may include unused or transient elements—to the user. Elements, as referred to herein, are icons, indicia, or other graphical representations that are displayed to a user in a notification area (often referred to as a "system tray") associated with a toolbar. Often, elements are displayed without the user's permission by the initiation of a program. For instance, the OS may execute anti-virus software in a background thread of a computer, resulting in a logo for the anti-virus software being displayed in the notification area and kept there permanently or until the anti-virus software finishes a task. The user typically cannot remove such a logo and therefore has to endure its display. As a result, the portion of the toolbar area used to display elements (i.e., the "notification area") is often used as an advertising space for presenting logos and graphics for software.

Some elements, referred to herein as "transient elements," are automatically presented and removed from notification area without the user directly interacting with the element itself. Transient elements are elements that automatically appear and disappear from the notification area without the user directly interacting with the element itself. For example, a printer icon may be displayed whenever a print job is queued or a reminder for a user to change a password may be displayed every three months without the user indicating a desire for their presentation. Others transient elements may be presented in response to a user action, even if the action occurred outside the notification area or toolbar.

Additionally, unused elements may be displayed in the notification area. For example, network & volume elements may be presented unless the user decides to turn them off, or an anti-virus logo may be displayed at all times. An icon for setting up a hardwired network connection may not be useful to the user if the user always uses a wireless Internet connection. Traditionally, many unused and transient elements are displayed automatically, thereby cluttering the notification area with unusable, non-removable elements that the user may or may not understand or use.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to controlling the display of elements in the notification area of a GUI. The user may select which elements can be displayed, thus barring other elements from the notification area. A list, referred to herein as an "order list," maintains various entries for elements chosen for display. The order list includes an indication of the particular display order for each chosen element, a file for the element, and the display status of the element. When a user repositions the element in the notification area (e.g., drags and drops the element to a different position), the order of the element is updated to reflect the new position. Also, when the user elects to remove the element from the notification area, the element's entry in the order list is deleted. Software managing the display of elements is configured to only display those elements in the order list according to the order designated by the user. Another aspect of the invention is directed to a notification area that displays the elements in the manner previously described.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
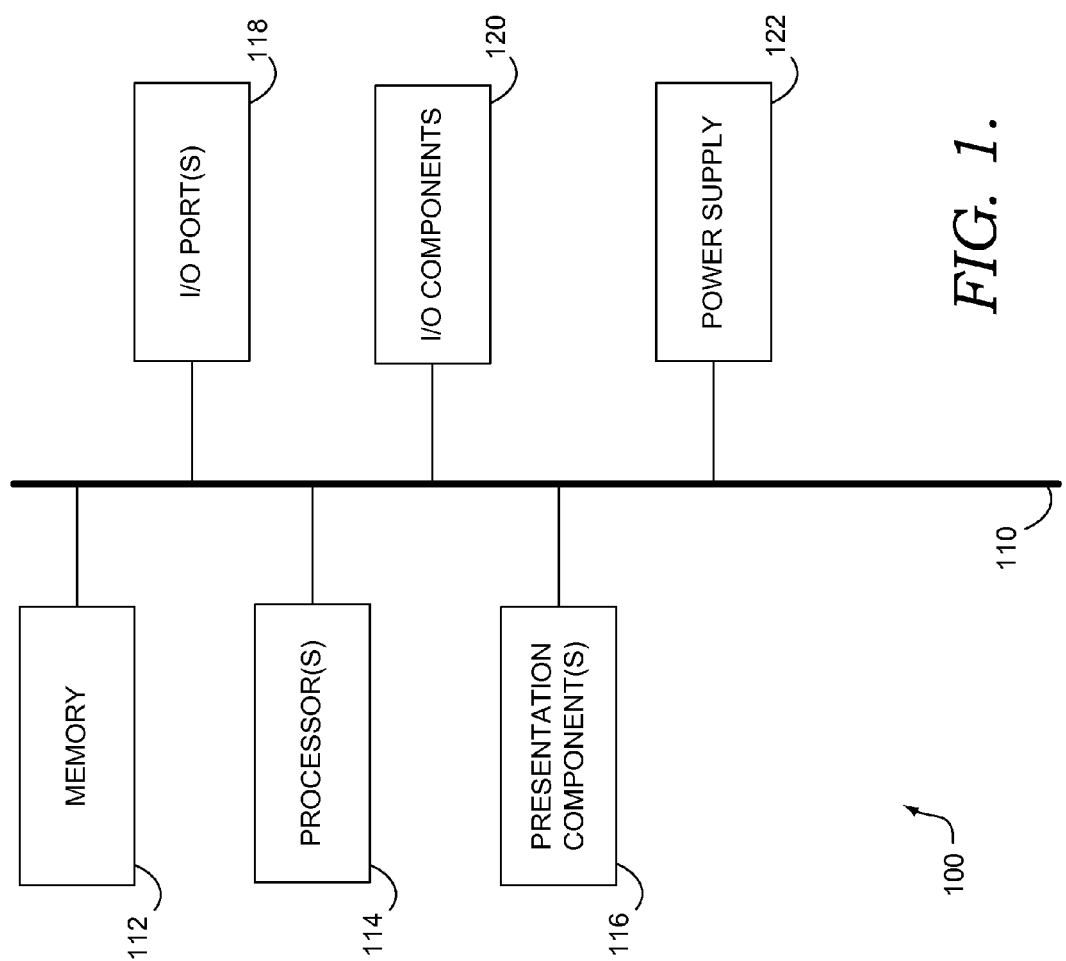
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

As one skilled in the art will appreciate, embodiments of the present invention may be embodied as, among other things: a method, system, GUI, or computer-program product that is embodied on one or more tangible computer-readable media. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media. Computer-readable media include both volatile and nonvolatile media as well as removable and nonremovable media.

By way of example, and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Embodiments described herein are directed toward systems for, methods to, and computer-storage media storing instructions for configuring a notification area of a toolbar to control and manage the display of the graphical elements presented in the notification area. In one embodiment, only the elements selected for display by the user are displayed in the notification area. The user may also designate the order the elements may be displayed in the notification area, so particulars elements will be displayed in the same position relative to other elements.

The notification area, as referred to herein, is a portion of a GUI that displays one or more elements. As mentioned above, elements include logos, indicia, and other graphics identifying software being executed by an OS. In one embodiment, the notification area is presented on or appended to the toolbar. Alternatively, the notification area may be presented in a separate GUI window. Because elements are merely renditions of logo, graphics, or image files, elements may be stored in any well-known file format—e.g., icon image file format (ICO), tagged image file format (TIFF or TIF), portable network graphics (PNG), graphics interchange format (GIF), Joint Photographic Experts Group (JPEG), bitmap image file format (BMP), portable document format (PDF), or the like.

The elements described herein may be transient (meaning they automatically appear or disappear without user intervention) or selected for display by the user. Embodiments are not limited to either type of element, however, as either—or a combination thereof—may be incorporated into the notification areas described below.

The notification area may be configured to only display a specific number of elements and provide an overflow feature that, when selected, enlarges the notification area to display additional elements. For example, an arrow pointing away from the notification area may be positioned on the outskirts of the notification. Once the arrow is selected, the notification may be configured to expand and reveal additional elements presented in a specific order. In an alternative embodiment, selection of the overflow feature initiates a separate window or a window appended to the toolbar, both of which display the elements in a particular order.

In one embodiment, a list of elements in a specific order may be maintained, and elements, when displayed, will be presented in relative position to other elements in order. For example, the list may include the following five element: (1) a logo for an e-mail application (e.g., Microsoft Outlook®), (2) a logo for anti-virus software (e.g., Norton AntiVirus® developed by Symantec Corporation® headquartered in Cupertino, Calif.), a graphic indicating a speaker control, and (4) a graphic indicating connections to wireless networks. These four elements may be listed, along with other elements, in the above sequential order as entries in an order list stored in a computing device. In one embodiment, the order list defines what elements can be displayed and the position in the notification area for displaying each element relative to other elements. Thus, the above four elements would be displayed, in one embodiment, in the following order: e-mail application logo, anti-virus software logo, speaker-control graphic, and wireless-network graphic. The list may also dictate the order for presenting elements that are revealed by enabling the extension feature.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

The components described above in relation to computing device 100 may also be included in a mobile device. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

Figure 2:
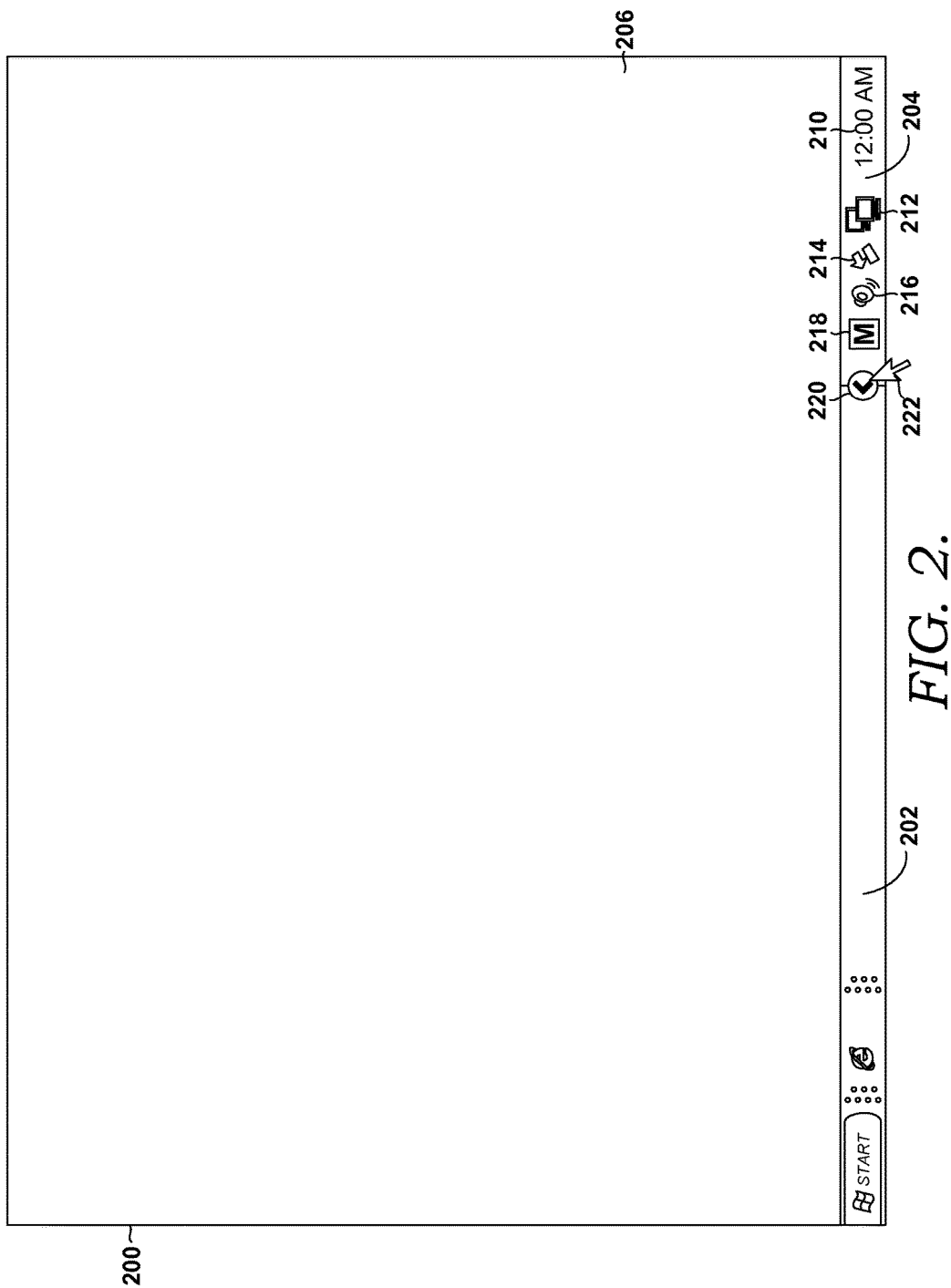
FIG. 2 is a diagram illustrating an exemplary GUI in accordance with an embodiment of the invention.

FIG. 2 is a diagram illustrating an exemplary GUI 200 in accordance with an embodiment of the invention. GUI 200 represents an OS executing on a computing device, such as computing device 100 described in reference to FIG. 1. Specifically, GUI 200 includes a toolbar 202, a notification area 204, and a removal area 206, all of which occupy spatial portions of the GUI 200. The notification area 204 includes a clock and the following elements: network graphic 212, hardware-removal graphic 214, volume graphic 216, and anti-virus software logo 218. An overflow feature 220 is depicted in the form of an arrow on the edge of the notification area 204. While only four elements are illustrated in FIG. 2, one skilled in the art will understand that other embodiments may, in fact, display more or less elements. It should also be noted that GUI 200 is provided merely for explanatory purposes and is not meant to limit embodiments to any particular GUI configuration.

Figure 3A:
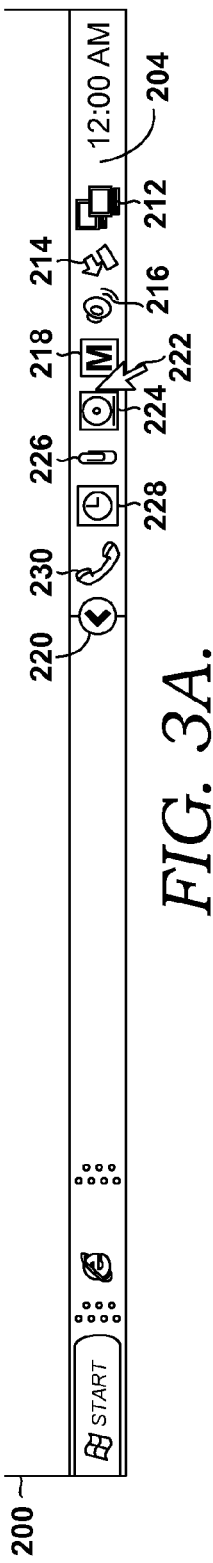
FIGS. 3A-3B are diagrams illustrating an exemplary GUI after a user has initiated an overflow feature in accordance with an embodiment of the invention.
Figure 3B:
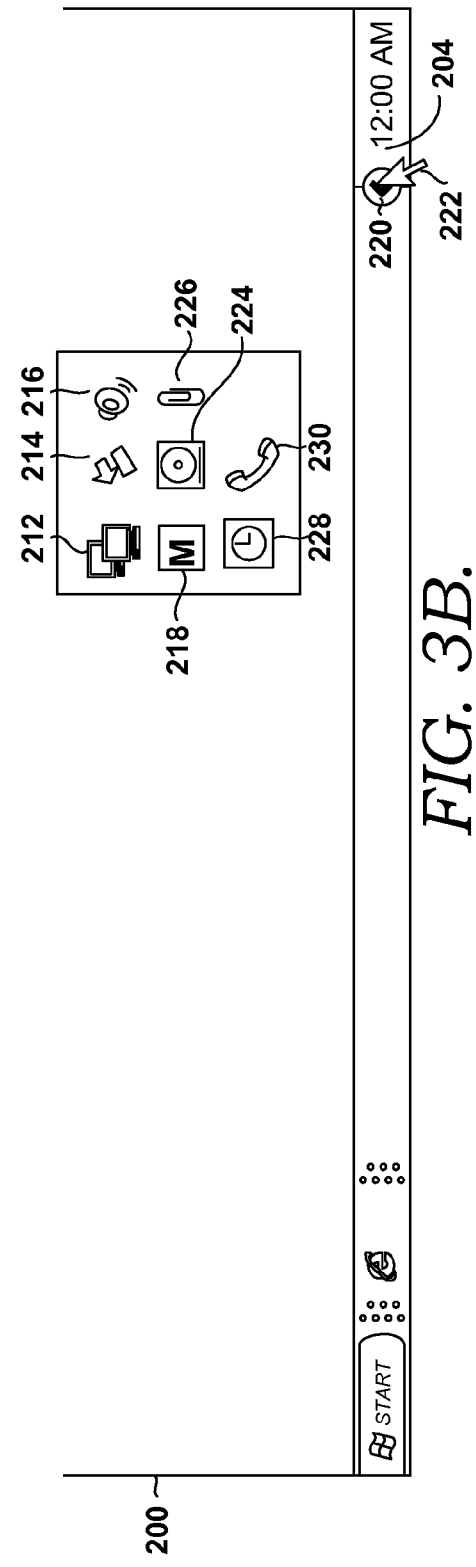

In addition to network graphic 212, hardware-removal graphic 214, volume graphic 216, and anti-virus software logo 218, GUI 200 may also hide several elements in an overflow area. When the user selects the overflow feature 220—for instance, with a mouse cursor 222—the previously hidden elements in the overflow area is revealed to the user. FIGS. 3A-3B show a portion of GUI 200 after the user has triggered the overflow feature 220, according to an embodiment of the invention. Once the overflow feature 220 is triggered, in one embodiment, the notification area 204 expands to reveal additional elements that were previously hidden. As seen in FIG. 3A, these additional elements include e-mail software logo 224, database logo 226, timing graphic 228, and phone application graphic 230.

In one embodiment, the revealed elements are presented in the notification area 204 in an order dictated by the user. Additionally, the user may freely delete an element from the notification area 204, whether expanded or not, by simply dragging the element out of the notification area 204 and dropping the element into the removal area 206. In one embodiment, this drag-and-drop maneuver deletes the dragged element from both the notification area 204 and the order list stored on the computing device.

One skilled in the art will appreciate that various software may be used to display elements in the notification area 204. For example, the Shell_NotifyIcon( ) shell included within the dynamic link library (DLL) Shell32.dll for Microsoft Windows® can be used to present elements in the notification area 204. Such software can be called to present elements whenever an application is initiated, currently running, or otherwise invoked by the user. One skilled in the art will understand that similar or alternative software may be used to display elements; therefore, such software need not be discussed at length herein.

In one embodiment, the order list is a list of all the elements that can be displayed in the notification area 204. In other words, all elements the user desires to display in the notification area 204 are contained within the order list. To remove an element from being displayed in the notification area 204, the user may drag an element from the notification area 204 and drop the element in the removal area 206. The removal area 206 may include any area in the GUI 200, except for either the toolbar area 202 (in some embodiments) or the notification area 204 (in other embodiments). Dragging an element from the notification area 204 to the removal area 206, called a "sloppy drag," removes the element and corresponding information from the order list—thus eliminating future displays of the element, unless otherwise specified by the user.

The order list contains various information for each element that the user allows to be displayed in the notification area 204. For example, the order list may store elements in a particular order a user wishes the elements to be presented in the notification area 204. Referencing FIG. 3A, the order list associated with the elements in the notification area 204 indicates that the following elements should displayed in the following order relative to the clock 210: network graphic 212, hardware-removal graphic 214, volume graphic 216, anti-virus software logo 218, e-mail software logo 224, database logo 226, timing graphic 228, and phone application graphic 230. In an alternative embodiment, these elements are presented within a separate window 232—as indicated in FIG. 3B—and displayed according to the order of the order list whenever the user initiates the overflow feature 220.

The user may manipulate the order for displaying elements by dragging a displayed element from its displayed location and dropping the element in another location in the notification area 204. For example, referring to FIG. 3A, if the user drags the volume graphic 216 from its current location and then drops the volume graphic 216 elsewhere in the notification area 204, the volume graphic 216 will be displayed in the new location, and an entry in the order list for the volume graphic 216 will automatically be moved—or updated—to include the new position. For example, if the volume graphic 216 is dropped in between the hardware-removal graphic 214 and the network graphic 212, an entry in the order list for the volume graphic 216 will be repositioned in between entries for the hardware-removal graphic 214 and the network graphic 212.

Similarly, if a user drags and drops an element outside the notification area 204—e.g., to the removal area 206 illustrated in FIG. 2—an entry for the element is removed from the order list. Once an element is removed from the order list, the element can no longer be displayed, in one embodiment, unless the user later adds the element back to the order list. The user may be prompted to add an element to the notification area 204, resulting in the element being added to the order list, whenever an application is initiated that is not listed in the order list. If the user elects to add the element to the order list, an entry is made to the order specifying any of the parameters described below.

The order list may include various information about elements. For instance, the order list may store the names of applications associated, file names and locations of files corresponding to elements, the display status of each element, or other information relevant to the display of the element. For clarity sake, an element that is being displayed in the notification area 204 is referred to as a "live" node, and an element not being displayed is referred to as a "dead" node. The order list ensures that transient element (i.e., elements that automatically appear and disappear in the notification area without user designation) do not appear in the notification area 204.

The order list contains, in one embodiment, entries with the aforesaid information for each element designated for display in the notification area 204. Each entry may indicate the order, name of the related software or application associated with the element, element file location or file name, and status (i.e., live or dead). Table 1 below shows an exemplary order list with fourteen entries, each having the following four different pieces of information: order, software, element, and display status.

TABLE 1

Order List Example

| OR-DER | SOFTWARE | ELEMENT FILE | STA-TUS |
|---|---|---|---|
| 1 | network connections | C://...network_graphic.tif | Live |
| 2 | device detector | C://...device_detector.jpg | Dead |
| 3 | hardware-removal graphic 214 | C://...hardware_removal_graphic.ico | Live |
| 4 | image reader logo | C://...image_reader_logo.tif | Dead |
| 5 | volume graphic 216 | C://...control/volume_graphic.tif | Live |
| 6 | processing graphic | C://...processing_graphic.img | Dead |
| 7 | anti-virus software logo 218 | C://...anti_virus_software_logo.png | Live |
| 8 | e-mail software logo 224 | C://...e_mail_software_logo.jpg | Live |
| 9 | database logo 226 | C://...database_logo.ico | Live |
| 10 | Windows Media Player® | C://...windows_media_player.tif | Dead |
| 11 | timing graphic 228 | C://...timer.jpg | Live |
| 12 | Adobe Reader® | C://...adobe.jpg | Dead |
| 13 | phone application graphic 230 | C://...phone.tif | Live |
| 14 | speech to Voice | C://...stv.tif | Dead |

To present the element in the notification area 204, software configured to present elements in the notification area 204 may receive and process an element file when the element's underlying application is initiated. For example, with reference to Table 1 above, the TIF file stored at C:// . . . network_graphic.tif could be passed to the NotifyIcon( ) in Microsoft Windows XP® and rendered whenever network connections are being monitored. Once displayed in the notification area 204, or in a separate window, the status entry in the order list is switched from dead to live.

Live elements are oriented in the notification area 204, or in a separate window, according to their assigned order in the order list. For example, elements that are lower on the order list are placed further away from the clock in the notification area 204, or possibly hidden within an overflow area. The notification area 204 may also be configured to only display a certain number of elements (e.g., eight elements), resulting in additional elements being hidden until a higher-order element turns dead or is removed.

In one embodiment, multiple order lists may be created and managed. One list contains the elements displayed within the notification area 204. And a second list contains overflow elements. Overflow elements are elements that would be displayed in the notification area 204 if there were fewer live elements being displayed with higher order. Furthermore, when the overflow area is displayed as a separate GUI window, elements contained therein may be ordered from top left to bottom right.

An element that has changed status from dead to live, will be displayed relative to the other live elements according to the order delineated in the order list. For example, with respect to Table 1, if the Windows Media Player® turns live, the file C:// . . . windows_media_player.tif will be displayed between the database logo 226 and the timing graphic 228. This could result in the last displayed element being hidden if the notification area 204 or separate window is configured to only display a particular number of elements. Similarly, if the Windows Media Player® element turns dead, its related element is removed from view and the display of the remaining elements is adjusted accordingly.

Figure 4A:
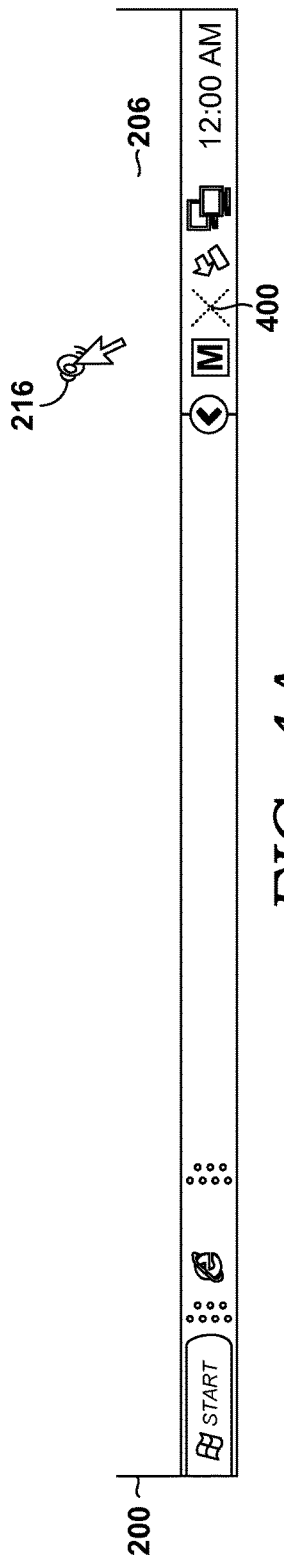
FIGS. 4A-4B are diagrams illustrating exemplary GUIs a user removing elements from a notification area in accordance with an embodiment of the invention.
Figure 4B:
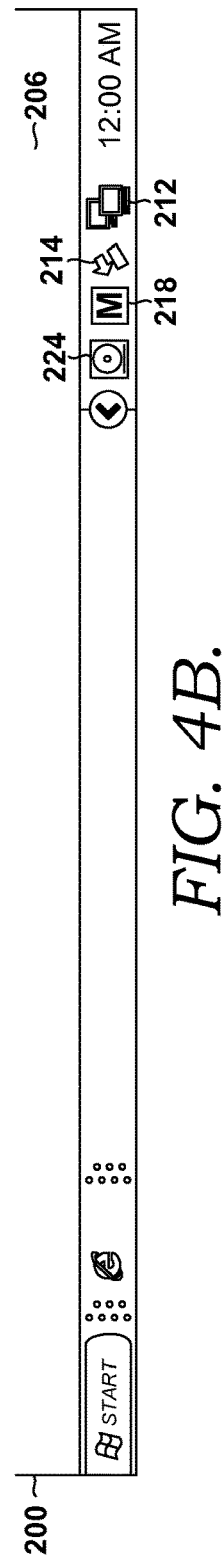

FIGS. 4A-4B are diagrams illustrating exemplary GUIs a user removing elements from a notification area in accordance with an embodiment of the invention. As seen in FIG. 4A, a user may drag an element (volume graphic 216) from the notification area 204 to the removal area 206, and an X 400 is placed in the element's former place on the notification area 204 until the element is dropped. Once dropped, the X 400 is removed, and element's entry in the order list is switched from live to dead, thus repositioning the remaining live elements to fill the void. Transparent to the user, the order list for the notification areas in FIGS. 4A and 4B would have been updated so that status of the volume graphic 216 would be changed from live to dead. As can be seen in FIG. 4B, this embodiment would position the anti-virus software logo 218 closer to the hardware-removal graphic 214 and move the e-mail software logo 224 from the overflow area into the notification area 204.

Figure 5:
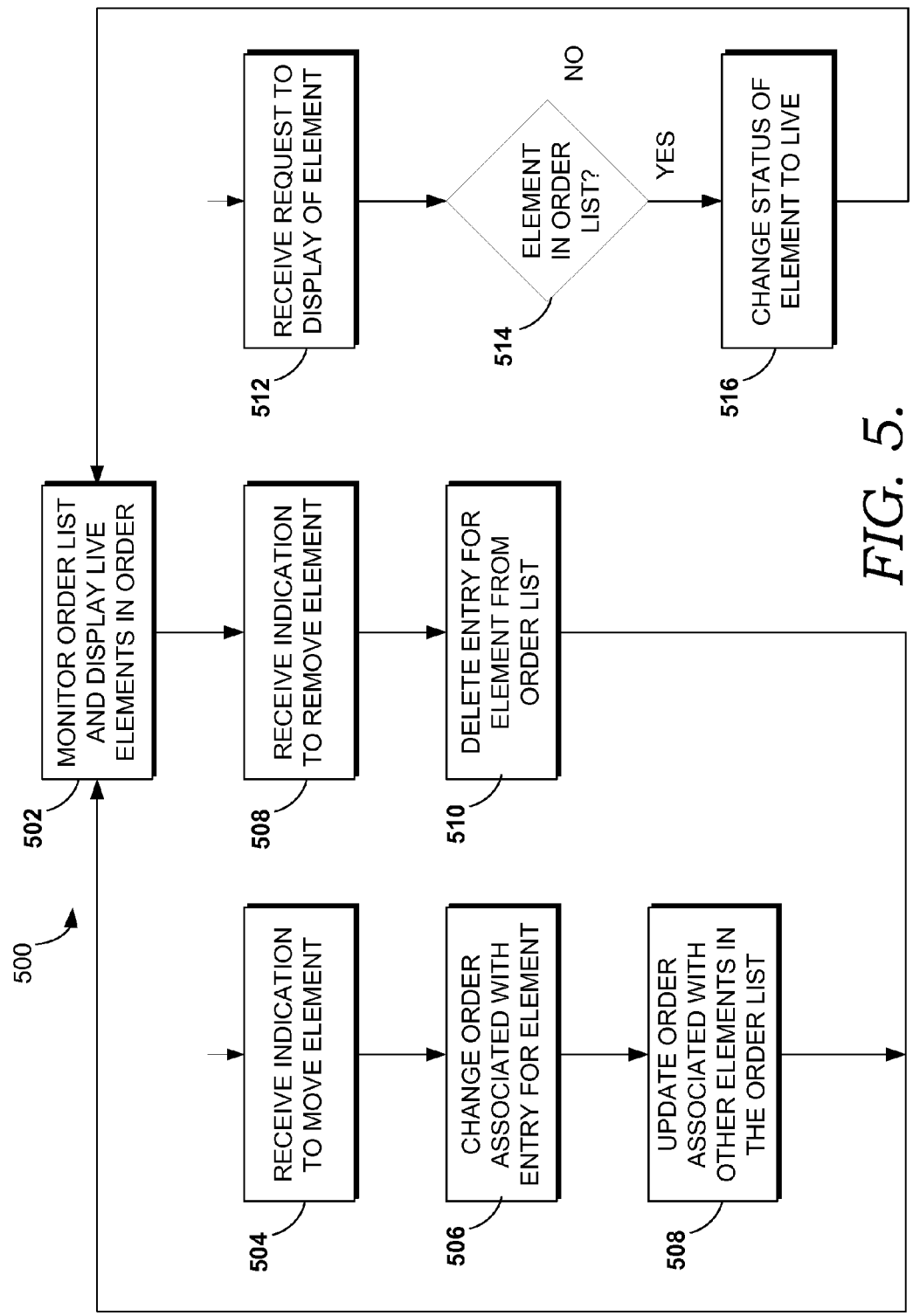
FIG. 5 is a diagram of a flow chart illustrating steps for controlling elements on a toolbar in accordance with an embodiment of the invention.

FIG. 5 is a diagram of a flow chart 500 illustrating steps for controlling elements on a toolbar in accordance with an embodiment of the invention. An order list is monitored to determine which elements to display in either a notification area, as indicated at 502. The entries of the order list may contain any of the information described herein (e.g., order, software, file, status) as well as other relevant information. The order list is continually monitored, and live elements are displayed within the notification area, also indicated at 502. Furthermore, elements are positioned according to the order in the order list. When the status of an element in the order list turns from live to dead, or is otherwise indicated to no longer be displayed in the notification area, the element is not displayed.

Elements may be moved within the notification area, removed from the notification, or triggered for display by manipulating entries in the order list. The three separate paths are performed independent of one another by simply changing entries in the order list. Also, even though flow chart 500 appears to be sequential in nature, the first step (502) is reiterative, and the three paths are merely ways to effectively move, remove, or display elements by changing parameters in the order list. Because the order list is constantly being monitored, changes to the entries effectuate changes to displayed elements. Additional elements, other than those specified by the user and included in the order list, are not allowed to be displayed in the notification area, in one embodiment.

To move an element within the notification area, a user may drag and drop the element in another area of the notification area, indicated at 504. Once such an indication is received, the order associated with moved element is changed to reflect the dropped position, as indicated at 506. For example, if the element is dragged from the first position next to the clock to the third position, the order assigned to the element is changed to reflect a position between the second and fourth displayed elements. The orders associated with the other elements in the order list are then updated to account for the moved element's new position, as indicated at 508.

To remove an element from the notification area, the user may move the element into a removal area (e.g., a portion of GUI other than the notification area), as indicated at 508. As a result, an entry for the removed element is deleted from the order list, as indicated at 510. In this embodiment, the removed element can not be displayed because only elements in the order list can be displayed.

Elements are typically displayed by calling a particular display function, such as the NotifyIcon( ) shell in Microsoft Windows®, and providing the display function with a file for the element. The initiation of an application or other software may result in a call to the display function to display an associated element, as indicated at 512. For example, an element for an anti-virus program may be shown when the anti-virus program is running. Or a particular driver have an element associated with it, and use of the driver may trigger a call to display the element. Calls to the function may be monitored, and requested elements checked against the order list, indicated at decision block 514. If the element is in the order list, the element's status is changed to live (indicated at 516), so the function can present the element. If the element is not in the order list (indicated by the NO path), no changes are made to the order list, and the element is not displayed.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. A method for displaying one or more elements within a notification area of a computing device, the method comprising:

receiving an attempt to display an element;

accessing an order list that contains a list of elements designated by a user for display within the notification area, wherein the order list contains for each element a definition of a display position specified by the user in which the element is to be displayed in the notification area relative to the display position in the notification area of all other elements identified by the definition of display position in the order list corresponding to the each of the other elements and the order list is modifiable by the user by adding one or more elements to the list of elements with a corresponding definition of display position for each of the added one or more elements to be displayed in the notification area of said computing device, by modifying the definition of display position for one or more elements in the list of elements, and by deleting one or more elements from the list of elements such that the deleted one or more elements deleted by the user from the list of elements are removed from the order list, no longer appear on the order list, and are no longer displayed in the notification area of said computing device, and wherein the definition of display position corresponding to each element in the list of elements is updated based on the user modifying the order list by at least adding one or more elements to the list of elements, modifying the definition of display position for one or more elements in the list of elements, or deleting one or more elements from the list of elements;

determining whether an entry for the element exists in the order list; and if the entry exists, displaying the element in the notification area at the position defined by the definition of position.

2. The method of claim 1, wherein the attempt to display the element is a portion of software calling a function to display the element.

3. The method of claim 1 further comprising changing a designation in the entry from dead to live.

4. The method of claim 1, wherein elements listed in an overflow order list indicates elements that are within an overflow area.

5. The method of claim 1, wherein the notification area comprises a separate graphical user interface (GUI) window.

6. The method of claim 1, wherein the element is positioned in the notification area according to one or more indications of order in the order list.

7. The method of claim 1, further comprising updating one or more indications of order, within the order list, wherein the one or more indications of order are associated with additional elements.

8. The method of claim 7, wherein the one or more additional elements are being displayed within the notification area.

9. The method of claim 1, wherein each of the one or more entries includes a status indication specifying whether each of the one or more entries is being displayed in the notification area.

10. The method of claim 1, wherein a displayed element, a first element, and a second element are oriented in the notification area based on an order associated with the displayed element, a second order associated with the second element, and a third order associated with the third element, respectively.

11. The method of claim 1, wherein an indication to move the first element comprises a user dragging and dropping the first element using the mouse.

12. The method of claim 1, wherein each of the one or more entries includes the location of a graphic for an element.

13. The method of claim 1, further comprising:
receiving an indication to remove the displayed element;
based on the indication to remove the displayed element, deleting an entry associated with the first element; and
refusing to display the display element because the entry no longer is contained in the order list.

14. The method of claim 13, further comprising:
identifying at least one element in an overflow area based on an associated entry in the order list; and
moving the at least one element to the notification area.

15. The method of claim 1, wherein the displayed element, the first element, and the second element are at least one of a graphic, logo, or image associated with portions of software or applications.

16. A method for displaying one or more elements within a notification area of a computing device, the method comprising:
storing a list of elements in an order list that identifies the plurality of elements designated by a user for display within the notification area;
displaying in the notification area, one or more elements from the plurality of elements in the order list, each element displayed in a position indicated by the user in the order list, wherein the order list contains for each element a definition of a display position specified by the user in which the element is to be displayed in the notification area relative to the display position in the notification area of all other elements identified by the definition of display position in the order list corresponding to each of the other elements and the order list is modifiable by the user by adding one or more elements to the list of elements with a corresponding definition of display position for each of the added one or more elements to be displayed in the notification area of said computing device, by modifying the definition of display position for one or more elements in the list of elements, and by deleting one or more elements from the list of elements such that elements deleted by the user from the list of elements are removed from the order list, no longer appear on the order list, and are no longer displayed in the notification area of said computing device, and wherein the definition of display position corresponding to each element in the list of elements is updated based on the user modifying the order list by at least adding one or more elements to the list of elements, modifying the definition of display position for one or more elements in the list of elements, or deleting one or more elements from the list of elements;
receiving an indication to change the display position of an element displayed in the notification area to a second position in the notification area;
changing in the order list, the value indicating the second position as the definition of display position;
upon an initiation of an application corresponding to the element, displaying the element in the notification area in the second position.

17. The method of claim 16, wherein the user is able to add elements to the order list to be displayed in the notification area of said computing device and delete elements from the order list such that deleted elements no longer appear on the order list and will no longer be displayed in the notification area of said computing device.

18. A graphical user interface (GUI) embodied on a non-transitory computer-readable medium and executable on a computer, said graphical user interface comprising: a notification area configured for displaying only one or more elements which forms a list of elements specified by a user for display within the notification area, wherein the one or more elements are displayed according to an order assigned by the user in an order list, wherein the order list contains for each element a definition of a display position specified by the user in which the element is to be displayed in the notification area relative to the display position in the notification area of all other elements identified by the list definition of display position in the order list corresponding to each of the other elements and the order list is modifiable by the user by adding one or more elements to the list of elements with a corresponding definition of display position for each of the added one or more elements to be displayed in the notification area of said computing device, by modifying the definition of display position for one or more elements in the list of elements, and by deleting one or more elements from the list of elements such that the deleted one or more elements deleted by the user from the list of elements are removed from the order list, no longer appear on the order list, and are no longer displayed in the notification area of said computing device, and wherein additional elements not indicated for display by the user are not allowed to be displayed in the notification area.

19. The GUI of claim 18, wherein the notification area is a separate GUI window.

20. The GUI of claim 18, wherein the one or more elements are movable within the notification area by the user, and once one of the one or more elements is moved, the order list is updated to reflect the new position of the one of the one or more elements indicated by the definition of display position corresponding to each of the one or more elements.

* * * * *